INVENTOR
HARRY M. VALENTINE
BY Scrivener & Parker
ATTORNEYS

Dec. 24, 1963 H. M. VALENTINE 3,115,371
EMERGENCY RELEASE SYSTEM FOR FLUID PRESSURE BRAKES
Filed June 28, 1961 4 Sheets-Sheet 3

INVENTOR
HARRY M. VALENTINE

BY Scrivener & Parker
ATTORNEYS

Dec. 24, 1963 H. M. VALENTINE 3,115,371
EMERGENCY RELEASE SYSTEM FOR FLUID PRESSURE BRAKES
Filed June 28, 1961 4 Sheets-Sheet 4

INVENTOR
HARRY M. VALENTINE

BY Scrivener & Parker
ATTORNEYS

United States Patent Office 3,115,371
Patented Dec. 24, 1963

3,115,371
EMERGENCY RELEASE SYSTEM FOR FLUID
PRESSURE BRAKES
Harry M. Valentine, Elyria, Ohio, assignor to Bendix-Westinghouse Automotive Air Brake Company, Elyria, Ohio, a corporation of Delaware
Filed June 28, 1961, Ser. No. 120,230
3 Claims. (Cl. 303—29)

This invention relates to fluid pressure operated braking systems and more particularly to a fluid pressure braking system which includes means for automatically applying the brakes under emergency conditions, the invention being particularly concerned with improved means for releasing the brakes after they have become applied automatically as the result of an emergency condition.

Fluid pressure brake systems frequently incorporate relay-emergency valves which, as is well known in the art, are adapted to be retained by normal pressure in an emergency line in a condition where they serve no purpose except to function as a relay valve for controlling the flow of fluid pressure from a local pressure reservoir to and from brake actuators in response to control or service pressure delivered to the relay portion of the valve from a manually operated brake valve.

In the event of loss of normal system pressure to a value below the setting of the emergency portion of the valve, the latter shifts automatically to a position where the pressure from the local reservoir is admitted directly to the brake chambers entirely independently of the brake valve, thereby automatically applying the brakes to bring the vehicle to an emergency stop.

Systems of the foregoing type, while operating reliably in the intended manner to stop a vehicle in an emergency, have not heretofore had the additional feature of being releasable except by the restoration of system pressure or by bleeding the entire system to atmosphere. The first method may be impossible because of a mechanical derangement in the vehicle engine or in the compressor and the latter method is undesirable because the brakes cannot obviously be reapplied by fluid pressure once the system has been bled down to atmosphere.

It is a principal object of the present invention to provide improved means for releasing emergency, fluid pressure-applied brakes without requiring either the restoration of system pressure or the bleed-down of the pressure in the emergency system to atmosphere.

More particularly, it is an object of the invention to provide a system for accomplishing the foregoing by the provision of means for selectively supplying auxiliary pressure to the relay-emergency valve from a source of auxiliary pressure so as to operate said valve exactly as if normal pressure existed in the emergency line.

More specifically, it is an object of the invention to provide means for supplying auxiliary pressure to the emergency portion of the relay-emergency valve with means being provided for deriving said auxiliary pressure from the same local source which also serves to actuate said brakes when control or service pressure is delivered to the relay portion of said valve from the manually actuated brake valve.

Still another object of the invention is to provide in a system of the foregoing nature means for selectively supplying either system pressure or auxiliary pressure to the relay-emergency valve for effecting emergency release of the brakes.

Another object of the invention is to provide means which accomplish the last mentioned object but which does not in any way interfere with emergency exhaustion of the emergency line by manual control means normally available to the vehicle operator.

Still another object of the invention is to provide emergency release means for a system which includes a relay-emergency valve and may also include spring-applied brakes, means being provided for simultaneously supplying auxiliary pressure to the emergency portion of the relay-emergency valve and to the spring brakes so that both the fluid pressure actuators and the spring actuators are moved simultaneously to their release positions.

Other objects and their attendant advantages will become apparent as the following detailed description is read in conjunction with the accompanying drawings wherein.

Figure 1:
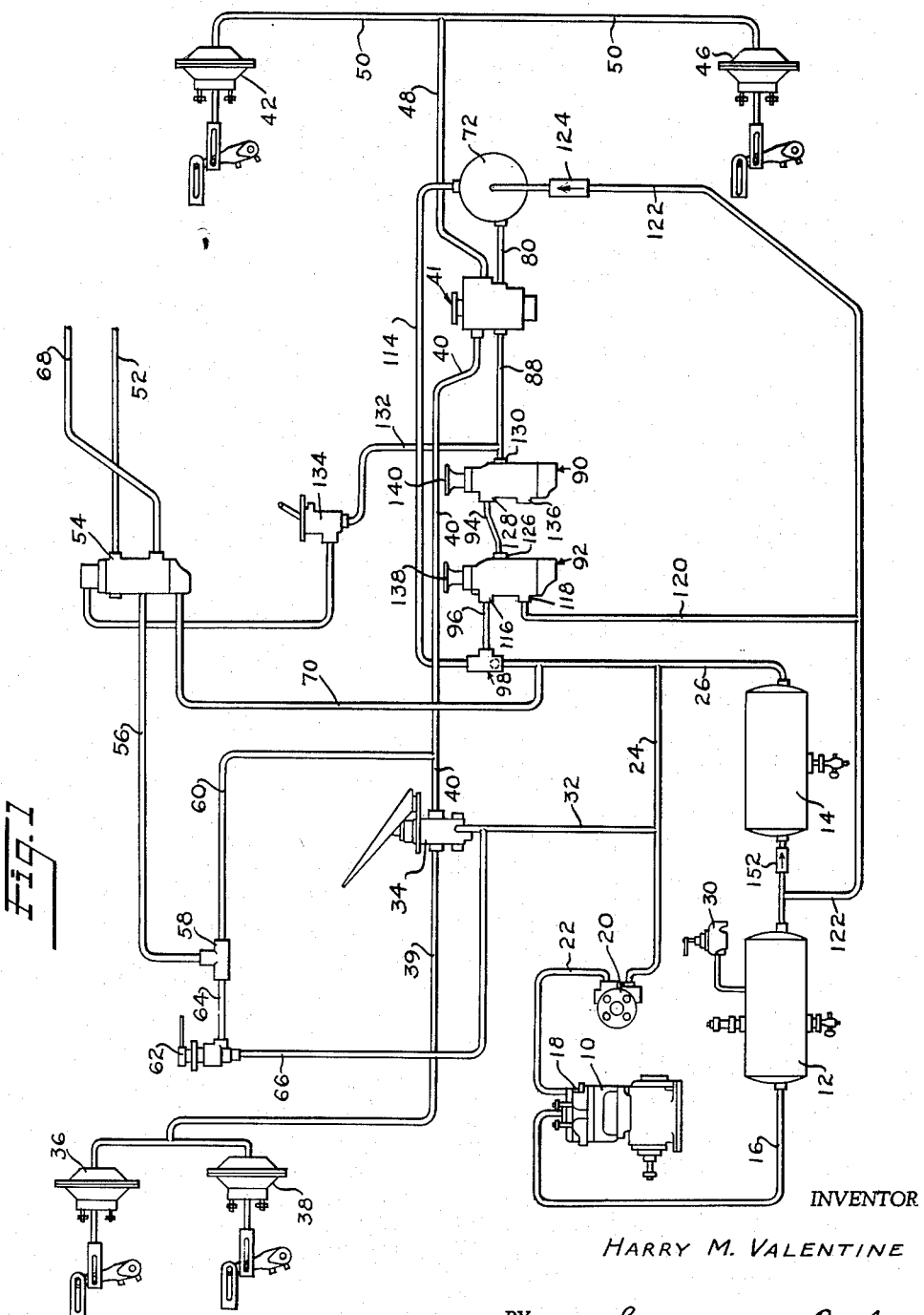
FIG. 1 is a diagrammatic view of a brake system embodying the features of the present invention.

The brake release system of the present invention is illustrated in FIG. 1 in connection with a conventional type of air brake system for use on tractor vehicles. More particularly, the system includes a compressor 10, for supplying compressed air to series-connected reservoirs 12, 14 through a conduit 16, the compressor having the usual unloader 18 controlled by a conventional governor 20 through conduits 22 and 24 connected with an outlet or tractor emergency conduit 26. A conventional low pressure indicator 30 is connected to the reservoir 12 and both reservoirs are connected by way of conduits 26, 24 and 32 with a manually operable self-lapping brake valve 34 which may be of any suitable type. Brake valve 34 may be provided with two outlet conduits for applying the front service brake chambers 36 and 38 on the tractor, by way of conduit 39, and for charging a service conduit 40 which leads rearwardly of the tractor to a conventional relay-emergency valve 41 for effecting application of the rear tractor brake chambers 42 and 46 by way of conduits 48 and 50, as will become more apparent hereinafter. A trailer service line 52 is connected with conduit 40 through a tractor protection valve 54, a conduit 56, a double check valve 58 of conventional construction, and a conduit 60. The tractor protection valve 54 may be constructed as shown in the patent to Andrews No. 2,850,330 dated September 2, 1958, and it will be understood by those skilled in the art that valve 54 is for the purpose of conserving in the tractor brake system a predetermined air pressure in the event of leakage in the trailer brake system or a break-in-two of the connected vehicles. If desired, a hand operated brake valve 62 of conventional construction may be connected to the double check valve 58 and the conduit 32 by means of conduits 64, 66, such valve enabling the operator to charge the conduits 56, 52 to apply the brakes on the trailer at any time that such valve is moved to a position to connect conduits 66, 64. Normally the valve 62 occupies a position where communication between conduits 56, 66 is interrupted. Tractor emergency conduit 26 is connected with trailer emergency conduit 68 through the tractor protection valve 54 and conduit 70.

As so far described, the brake system is in all respects conventional and it will be apparent that when the brake valve 34 is applied service pressure will be simultaneously supplied to the front brake actuators 36, 38 and to the tractor and trailer service conduits 40, 52 to effect simultaneous application of all brake chambers on the connected vehicles. As is known in the art, when service pressure is supplied to the relay-emergency valve 41, the relay portion thereof is actuated to open a valve to connect pressure in a local pressure reservoir 72 with conduits 48, 50 connected to the chambers 42, 46. When the brake valve 34 is moved to release position, pressure is removed from the relay portion of the relay-emergency valve so that the valve means responsive to the relay portion moves to a position disconnecting reservoir 72 from the brake chambers 42, 46 while simultaneously connecting the latter to atmosphere.

Figure 5:
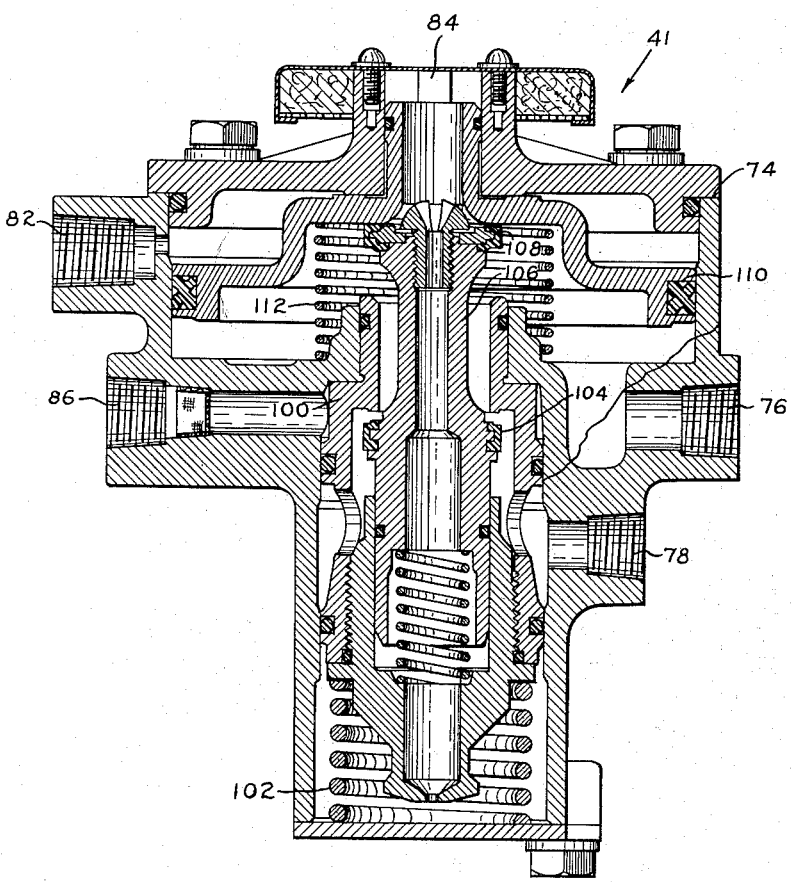
FIG. 5 is an axial sectional view of a form of relay-emergency valve which may be used in connection with the systems of FIGS. 1 through 3.

The relay-emergency valve 41 is illustrated in FIG. 5 and may be substantially identical to the valve described in the patent to Morse No. 2,937,052 issued May 17, 1960, and to which reference is made for a detailed description. Broadly, however, the valve consists of a casing 74 having an outlet port 76 which is connected to the brake chambers 42, 46 by way of conduits 48, 50, a supply port 78 which is connected to the local reservoir 72 by way of a conduit 80, a service or control port 82 which is connected to the tractor service conduit 40, an exhaust port 84, and an emergency port 86 which is connected to the emergency conduit 26 by way of a conduit 88, a pair of serially connected control valves 90, 92 joined by a conduit 94, a conduit 96, and a conventional double check valve 98. The function and structure of the valves 90, 92 are hereinafter described but for present purposes it can be assumed that the conduit 88 is directly connected to the emergency conduit 26 so that the pressure prevailing in conduit 26 is admitted to port 86 of valve 41 and if this pressure is above a predetermined safe value of, say, 40 p.s.i., it acts on the emergency portion, comprising a piston 100, to move this downwardly against the upward force of a spring 102 thereby closing a valve 104 carried on an inner-slidable member 106 which is also moved downwardly with piston 100 to open a valve 108 controlling the exhaust port 84. When valve 104 is closed, port 78 leading to local pressure reservoir 72 is disconnected from the port 76 leading to the brake chambers 42, 46 while at the same time the latter are connected to atmosphere through the open valve 108 controlling the exhaust port 84 as above mentioned.

The valve 41 contains a relay portion, comprising a piston 110 which is responsive to service pressure delivered to the service port 82 by way of the brake valve 34 and conduit 40 and is movable by said service pressure downwardly against a spring 112 to first close the exhaust valve 108 and thereafter open the valve 104 so as to connect the pressure at port 78, derived from the local reservoir 72, with the port 76 leading to the brake chambers. As is well known, the relay portion of valve 41 is self-lapping and when the pressure in the brake chambers is substantially equal to the service pressure acting on the relay piston 110, the latter is moved under the influence of spring pressure to a position where both of the valves 104, 108 are closed and the valve 41 is then said to be in lapped condition, release of service pressure from port 82 permitting piston 110 to be moved upwardly clear of valve 108 thereby opening the same to connect the brake chambers to atmosphere to release the brakes.

Those skilled in the art will recognize that so long as the emergency pressure acting on emergency piston 100 is above a predetermined safe value, of, say, 40 p.s.i., the piston 100 remains in a depressed position against the force of spring 102 and performs no function whatsoever in the normal actuation of the brakes. However, when emergency pressure falls below 40 p.s.i., the spring 102 moves piston 100 to the position shown in FIG. 5 and in so doing exhaust valve 108 is closed and immediately thereafter valve 104 is open so that local reservoir 72 is directly connected to the brake chamber by way of port 78, 76 and the brakes are automatically applied completely independently of the brake valve 34, and the vehicle is thereby brought to an emergency stop.

As so far described, the relay-emergency valve operates exactly as known to the prior art. However, in the prior art where the brakes were set in response to the fall of system pressure below the minimum safe value of 40 p.s.i., the brakes remained set so long as pressure existed in the local reservoir 72 and no means other than by the restoration of system pressure to a value above 40 p.s.i. or by bleed down of the local reservoir to atmosphere were provided for effecting release of the brakes. In accordance with the present invention, means are provided for selectively releasing the brakes after they have been applied under emergency conditions, without the necessity of resorting to either of the above two methods. The means provided by the invention comprises an addition to the present known braking systems of an auxiliary source of fluid pressure which may be controlled by hereinafter described valve means to selectively admit auxiliary pressure to the emergency port 86 of the valve 41 so as to move the emergency piston 100 to its release position exactly as if pressure above the predetermined value existed in the emergency conduit 26. In accordance with one aspect of the invention, the source of auxiliary pressure need not necessarily be a separate auxiliary reservoir but said auxiliary pressure may, if desired, be derived from the local reservoir itself and by the provision of suitable valving, pressure from the local reservoir may be tapped back into the emergency port 86 and so long as this pressure is above the predetermined value of 40 p.s.i. the emergency piston 100 will be moved to its release position.

With reference to FIG. 1, the foregoing may be accomplished by the provision of a conduit 114 interconnecting the local reservoir 72 and the double check valve 98. As previously mentioned the outlet of the check valve 98 is connected by a conduit 96 to one inlet port 116 of the manual control valve 92 which has also a second inlet port 118 which is connected by way of a conduit 120 with a conduit 122 which interconnects main reservoir 12 through a check valve 124 with the local reservoir 72. The valve 92 has an outlet port 126 which has connected thereto the aforementioned conduit 94 leading to an inlet port 128 of the second manual control valve 90. The latter member has an outlet port 130 which is connected to the aforementioned conduit 88 and to this latter conduit there is connected a conduit 132 which is connected to the control chamber of the tractor protection valve 54 through a conventional two-way valve 134 which may be moved from a position where conduit 132 is connected to the control chamber of valve 54 to a position where the conduit 132 is disconnected from the control chamber while the latter is connected to atmosphere to thus effect an emergency application of the trailer brakes in a manner well recognized in the art.

Figure 4:
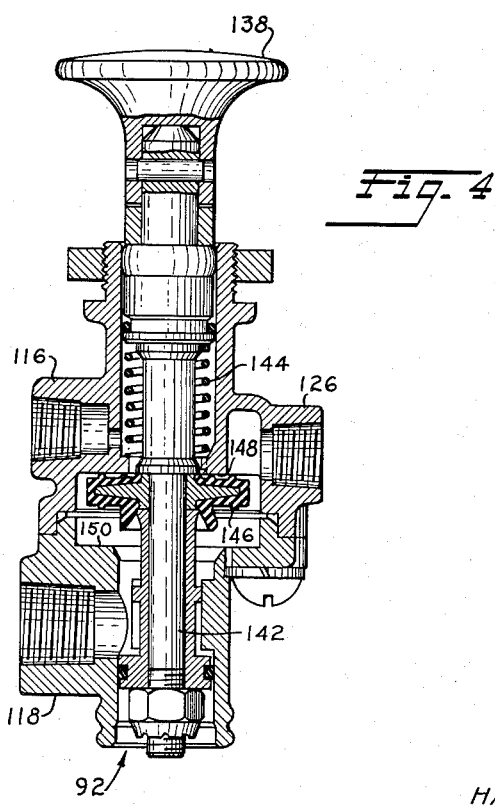
FIG. 4 is an axial sectional view of a control valve for use in the systems of FIGS. 1 through 3.

Referring again to valve 90 this is provided with an exhaust port 136 and each of the valves 90, 92 are identical to each other and have manually operable handles 138, 140 for alternatively connecting their respective outlet ports 126, 130 with either of the inlet ports 116 or 118, in the case of valve 92, and with inlet port 128 or exhaust port 136 in the case of valve 90. The valves 90, 92 may be substantially identical to the control valve more particularly shown and described in the prior co-pending application of Valentine et al., Serial No. 42,811, filed July 14, 1960, and assigned to the same assignee as the present application. With particular reference to FIG. 4, which illustrates the valve 92, it will be observed that the handle 138 is connected to a plunger element 142 which is normally urged by a spring 144 to the position shown in FIG. 4 where it will be observed that port 118, connected to main reservoir 12 by way of conduit 120, 122 is connected to port 126 and hence to conduit 94 leading to inlet port 128 of the valve 90. When the handle 138 is pushed downwardly against the spring 144, a valve element 146 carried on the plunger 142 is moved out of sealing relationship with a valve seat 148 and into sealing relationship with a valve seat 150 thereby disconnecting ports 118, 126 while simultaneously connecting the latter to the inlet port 116.

As thoroughly explained in the co-pending application, when the valve element 146 has been thus moved it will be retained in the second position by pressure above the predetermined pressure of 40 p.s.i. acting on the increased area on the upper side of the valve element 146 which becomes exposed to the pressure at port 116 when the lower side of the valve element 146 is moved into sealing engagement with the valve seat 150. As will become apparent, the normal position of valve 92 is that shown in FIG. 4 where ports 118, 126 are connected and the fact that the valve element may be retained in its second position by pressure acting on the upper side thereof is not important in the operation of valve 92, though this is an important feature in connection with the operation of valve 90 in order that conduits 94, and 88 can be retained connected so long as pressure in conduit 94 is above the predetermined value. However, whenever the pressure in conduit 94 falls below the predetermined value, it is desirable that the valve element in valve 90 be automatically moved to the position corresponding to the position of valve 92 in FIG. 4, in order that the conduit 88 leading to the emergency port 86 of the relay-emergency valve 41 is connected to atmosphere by way of port 136 in valve 90 so that the emergency portion of valve 41 can move immediately to its emergency position to produce an automatic setting of the rear tractor brakes. It will be apparent that when conduit 88 is connected to atmosphere through port 136, conduit 132 leading to the control chamber of the tractor protection valve 54 will likewise be exhausted to atmosphere thereby causing an immediate automatic setting of the trailer brakes. It will be understood also that the operator may at any time produce an automatic setting of the tractor and trailer brakes by merely grasping the handle 140 and pulling this outwardly against the pressure force acting on top of the valve element in valve 90 corresponding to the element 146 of valve 92 shown in FIG. 4.

Before describing the operation of the invention, it should be noted that the main reservoirs 12, 14 are interconnected through a one-way check valve 152 whose purpose will be apparent as the description proceeds. Assume now that system pressure is substantially above the predetermined safe value of 40 p.s.i. and that this value prevails in the main reservoir 12, 14 and also in the local reservoir 72. Assume further that the control valves 90, 92 are in the position of FIG. 4 so that the conduit 88 leading to the emergency portion of relay-emergency valve 41 is connected to atmosphere as is also the control chamber of the tractor protection valve so that the brakes on the tractor and on the trailer are applied. When the operator wishes to release the brakes, he merely pushes in on the handle 140 of valve 90, thereby admitting main reservoir pressure to the emergency portion of relay-emergency valve 41 by way of conduit 122, 120, ports 118, 126 of valve 92, conduit 94, and ports 128, 130 of valve 90. At the same time pressure is also admitted to the control chamber of valve 54, thus releasing the brakes on both vehicles. Assume now that after a period of driving the pressure in the system falls to a value below 40 p.s.i. Immediately upon this occurrence valve 90 moves to the position of FIG. 4 thereby exhausting conduits 88 and 132 so that an emergency application of the brakes is received and the vehicles are brought to an immediate stop. Assume now that for some reason pressure cannot be restored in the main reservoirs 12, 14 but it is nevertheless necessary that the vehicle be removed from the place where it was brought to an emergency stop. Under these circumstances, the operator now pushes in on the handle 138 of the valve 92 so that pressure existing in conduit 96, which leads to the inlet port 116 of valve 92, can be admitted to the conduit 94 leading to the inlet port 128 of the valve 90 which for the moment remains in the position of FIG. 4 to which it snapped upon the fall of system pressure below 40 p.s.i. The operator now merely pushes inwardly on the handle 140 of the valve 90 thereby admitting the pressure in conduit 96 to the conduit 88 so that the relay-emergency valve and the tractor protection valve can be moved by this pressure to their release positions thereby releasing the brakes on the tractor and on the trailer so that the vehicle may be subsequently moved. Because it has been assumed that the pressure in both of the main reservoirs 12, 14 has fallen below the predetermined safe value, the auxiliary pressure that will be supplied to conduit 88 for effecting release of the brakes, will be derived from the local reservoir 72, which now also serves as a source of auxiliary pressure, by way of conduit 114 and double check valve 98 whose element will be moved by the higher pressure in conduit 114 to a position whereby conduits 114, 96 are connected while the latter is disconnected from conduit 26. However, in accordance with one aspect of the invention, should for some reason the pressure in the local reservoir 72 be below the predetermined value, whereas the pressure in the second main reservoir 14 is still above the predetermined value, then this pressure will be supplied by way of double check valve 98 to the conduit 96 to effect release of the brakes. It is to provide for this contingency that the check valve 152 is interposed between the main reservoirs 12, 14 and upstream of the connection of the conduit 122 with the main reservoir 12. In other words, while reservoir 14 serves principally as a main reservoir for permitting normal control of the brakes, it also serves under certain conditions as an auxiliary pressure source for enabling emergency release of the brake in the manner above described.

Figure 2:
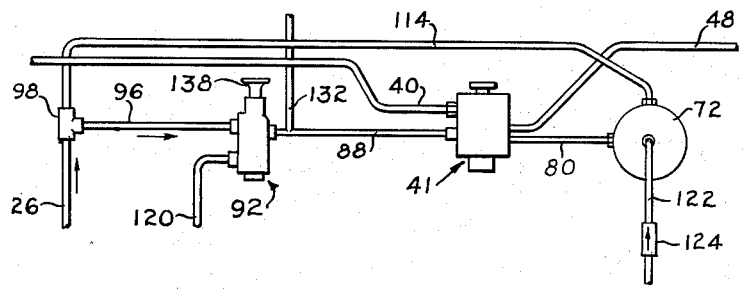
FIG. 2 is a partial view of the system of FIG. 1 but showing a modification of the present invention.

Referring now to FIG. 2 the system there disclosed is identical to the system of FIG. 1 and like reference numerals indicate identical parts in both systems. The sole distinction between FIG. 1 and FIG. 2 is that the control valve 90 is eliminated. The release valve 92 remains however, and in its normal position of FIG. 4 it serves no function and the braking system operates exactly as if valve 92 did not exist. However, after the vehicle has been brought to an emergency stop in response to the fall of system pressure below the predetermined value, the brakes may be released as previously described in connection with FIG. 2 by the operator's merely pushing inwardly on the handle 138 of valve 92 to connect conduit 96 directly to conduit 88, the pressure in conduit 96 being derived either from main reservoir 14 or from local reservoir 72 depending upon which is higher.

Figure 3:
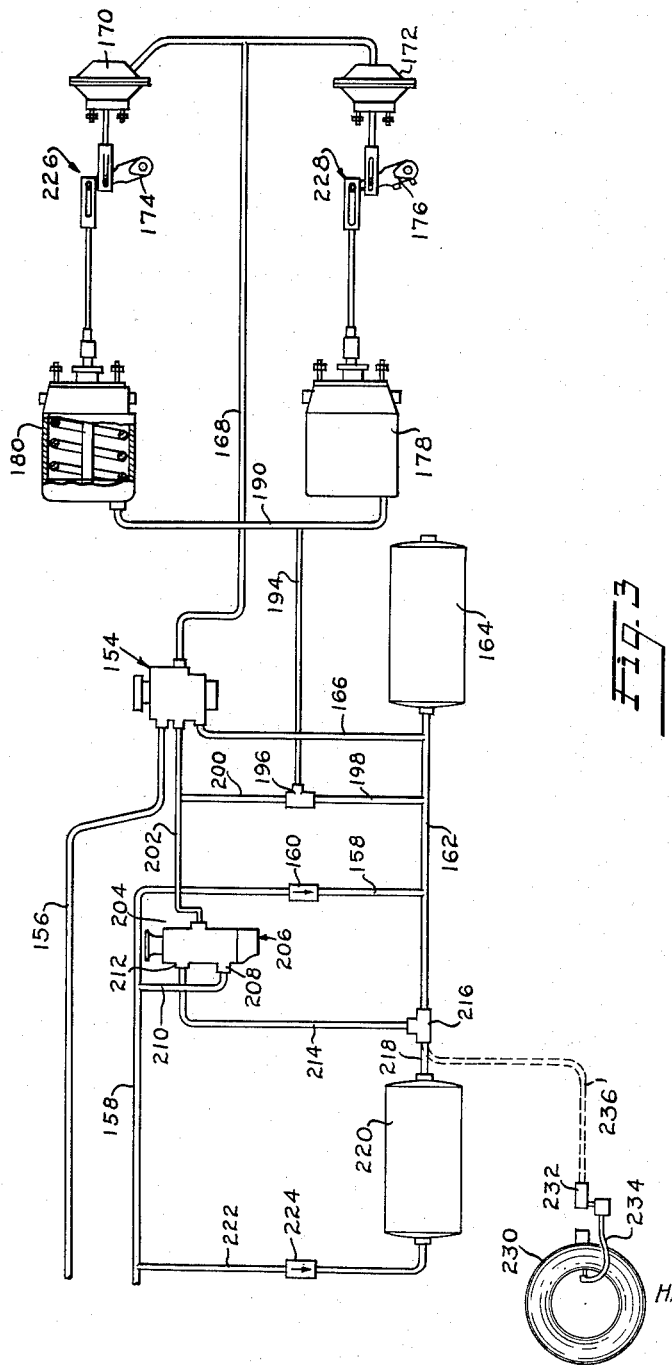
FIG. 3 is a diagrammatic view showing the present invention shown as particularly adapted for use on a trailer vehicle which may also employ spring applied safety brake actuators.

From the foregoing description, it should be apparent that, if desired, auxiliary release pressure could be derived from a source of auxiliary supply which may be a separate isolated reservoir which is connected to the main reservoir through a check valve, or the auxiliary pressure might be derived from a source not in any way connected with the vehicle braking system, as for example, from one of the vehicle tires. Such a system is illustrated in FIG. 3 in connection with a trailer braking system, which may or may not include spring operated safety brake actuators. In the system as shown the trailer is provided with a relay emergency valve 154 which is identical in all respects with the valve 41 already described. The valve 154 has connected thereto a service conduit 156, and also carried on the trailer is an emergency conduit 158 which is connected through a check valve 160 with a conduit 162 leading to the trailer reservoir 164 which is also connected by way of conduit 166 with the supply port of the valve 154. The valve 154 has the usual outlet conduit 168 leading to the trailer brake chambers 170, 172 which are operatively connected to conventional slack adjusters 174, 176 which are also operatively connected with spring brake actuators 178, 180 normally suspended in inactive position by fluid pressure received through conduits 190, 194 connected to the outlet of a double check valve 196 whose aligned inlets are respectively connected to conduits 198, 200. Conduit 198 is connected to the aforementioned conduit 162 leading to trailer reservoir 164 and the conduit 200 is connected to a conduit 202 which interconnects the emergency port of the relay emergency valve 154 and an outlet port 204 of a manual control valve 206 which may be in all respects identical to the valve 92 illustrated in FIG. 4. The valve 206 has a first inlet port 208 which is connected by way of a conduit 210 with the trailer emergency conduit 158. The valve 206 has a second inlet port 212 connected to a conduit 214 leading to the outlet of a double check valve 216 whose opposed inlets are respectively connected to the conduit 162 leading to the trailer reservoir 164 and to a conduit 218 leading to a second isolated reservoir 220 which is connected by way of conduit 222 and check valve 224 with the trailer emergency conduit 158.

In normal operation, the valve element of valve 206 is in the upper position of FIG. 4 and trailer emergency conduit 158 is thus directly connected with the emergency port of the relay-emergency valve by way of conduit 210, port 208, port 204, and conduit 202. When the pressure in the emergency conduit 158 falls below the predetermined safe value the relay-emergency valve 154 goes into emergency and connects the pressure in trailer reservoir 164 directly with the brake actuators 170, 172 to move these in a brake applying direction and assuming the pressure in the trailer reservoir 164 is above the predetermined value, as it would normally be expected to be, the spring brakes 178, 180 will be retained in their release position and will not in any way interfere with the actuation of the brakes by the fluid pressure actuators. This result is, of course, achieved through the well-known slotted connections, generally indicated by the numerals 226, 228 of the pushrods of the separate actuators with the slack adjusters 174, 176.

After the trailer brakes have thus received an emergency application, they may be released exactly as in FIGS. 1 and 2, by merely pushing the handle of valve 206 inwardly thereby connecting the above normal pressure in trailer reservoir 164 with the emergency port of the relay emergency valve 154 by way of conduit 162, double check valve 216, conduit 214, ports 212, 204 of valve 206 and conduit 202. In the event that the pressure in trailer reservoir 164 is below the predetermined value, this pressure cannot for obvious reasons be utilized to effect release of the fluid brake actuators and because this pressure is below normal the spring brake actuators 178, 180 will move to their applied position. Now, if it is desired to release the spring brakes while at the same time relieving the fluid actuators of whatever residual pressure may exist therein, the operator again merely pushes the handle of valve 206 inwardly and the higher pressure previously trapped in the isolated reservoir 220 will now act through conduit 218 to shift the element of double check valve 216 to a position whereby conduit 218 is connected to conduit 214 so that pressure above the predetermined safe value can be admitted through conduit 202 to the emergency port of the relay-emergency valve and at the same time this pressure travels through conduit 200 to check valve 196 to shift the element thereof so that conduits 194, 200 are connected to supply release pressure to the spring brake actuators 178, 180 and all of the brakes are thus entirely released.

In the event that the trailer is not provided with an isolated reservoir, the present invention permits the release of the brakes by connecting the above described system to a separate source of pressure such as, for example, a vehicle tire 230 by means of suitable couplings 232 and detachable flexible hoses 234, 236. The hose 236 could, for example, be permanently connected to the same side of the double check valve 216 as would the conduit 218 where an isolated reservoir is employed. The couplings of part 232 connected to the hose 236 would, of course, contain a suitable check valve to insure against possible leakage from the trailer system to atmosphere.

It should be apparent from the foregoing description that the present invention affords novel release means for brake systems employing conventional relay-emergency valves by affording means for supplying auxiliary pressure to the emergency port of the relay-emergency valve so that the valve responds exactly as if normal pressure existed in the usual emergency conduit. The invention contemplates supplying the auxiliary pressure either directly from the local reservoir which serves the relay-emergency valve or from an isolated reservoir which may receive its pressure from the main supply source of the system. On the other hand, if neither of the above sources of supply are available, the invention contemplates the use of an entirely external source of supply not in any way associated with the braking system. In the system illustrated in FIG. 3 it will, of course, be apparent to those skilled in the art that the system is not dependent for its effectiveness upon the use of spring brake actuators but such actuators are illustrated for the purpose of showing how the auxiliary source of pressure can serve both to release spring brakes while simultaneously operating on the relay-emergency valve to insure release of the fluid pressure actuators. It will be apparent to those skilled in the art that the systems of the present invention are susceptible of a wide variety of modifications and changes without, however, departing from the scope and spirit of the appended claims.

What is claimed is:

1. A brake system which includes first and second sources of fluid pressure, a relay-emergency valve having emergency and inlet ports, an emergency conduit connected to said emergency port, and a fluid connection between said second source of pressure and said inlet port, in combination therewith, a third source of fluid pressure, a double check valve having a pair of inlet ports respectively connected to said third and second sources of fluid pressure and having an outlet port, a manually operable valve having first and second inlet ports each respectively connected to the outlet port of said double check valve and to the first source of fluid pressure and having an outlet port connected to said emergency conduit, said manually operable valve including a valve element movable between a first position wherein said first inlet port is disconnected from said outlet port and the latter is connected to said second inlet port and a second position wherein said second inlet port is disconnected from said outlet port and the latter is connected to said first inlet port.

2. The brake system of claim 1 including a second valve means downstream of said manually operable valve and having inlet and outlet ports respectively connected to the outlet port of said manually operable valve and to said emergency conduit and having an exhaust port, said second valve means including a valve element, manual means for moving said element between a first position wherein said inlet port is connected with said outlet port and the latter is disconnected from said exhaust port and a second position wherein said inlet port is disconnected from said outlet port and the latter is connected to said exhaust port.

3. The brake system of claim 2 including resilient means normally urging the valve element of said second valve means towards its first position and fluid pressure responsive means responsive to pressure above a predetermined pressure at said inlet port for retaining said element in its second position after it has been moved thereto by said manual means.

References Cited in the file of this patent

UNITED STATES PATENTS

| | | |
|---|---|---|
| 2,645,307 | Stegman | July 14, 1953 |
| 2,923,576 | Seale | Feb. 2, 1960 |
| 2,991,129 | Gasser | July 4, 1961 |

FOREIGN PATENTS

| | | |
|---|---|---|
| 331,787 | Italy | Nov. 15, 1935 |